(12) United States Patent
Maliszewski et al.

(10) Patent No.: US 9,700,867 B2
(45) Date of Patent: Jul. 11, 2017

(54) METHOD FOR CHEMICAL DESTROYING OF MAGNETIC DATA CARRIERS

(75) Inventors: Waldemar Maliszewski, Wroclaw (PL); Kazimierz Szyszka, Wroclaw (PL); Janusz Iwaniec, Zbylitowska Góra (PL)

(73) Assignee: BOSSG & EIT + TECHNOLOGIES SPOLKA Z OGRANICZONA ODPOWIEDZIALNOSCIA (PL)

( * ) Notice: Subject to any disclaimer, the term of this patent is extended or adjusted under 35 U.S.C. 154(b) by 205 days.

(21) Appl. No.: 14/409,377

(22) PCT Filed: Aug. 9, 2012

(86) PCT No.: PCT/PL2012/000066
§ 371 (c)(1),
(2), (4) Date: Dec. 18, 2014

(87) PCT Pub. No.: WO2014/007664
PCT Pub. Date: Jan. 9, 2014

(65) Prior Publication Data
US 2015/0321160 A1  Nov. 12, 2015

(30) Foreign Application Priority Data

Jul. 2, 2012 (PL) .......................... 399758
Jul. 9, 2012 (EP) ..................... 12005063

(51) Int. Cl.
*C09K 3/00* (2006.01)
*B01J 16/00* (2006.01)
*G11B 23/50* (2006.01)

(52) U.S. Cl.
CPC ............ *B01J 16/00* (2013.01); *G11B 23/505* (2013.01)

(58) Field of Classification Search
CPC ................................ B01J 16/00; G11B 23/505
USPC ........................................ 252/183.14, 183.11
See application file for complete search history.

(56) References Cited

U.S. PATENT DOCUMENTS

| 2001/0002297 | A1 | 5/2001 | Schweizer et al. |
| 2004/0126450 | A1 | 7/2004 | Barkans |
| 2004/0252628 | A1* | 12/2004 | Detzler ................ G06F 21/554 369/288 |
| 2005/0257049 | A1 | 11/2005 | Farag |

FOREIGN PATENT DOCUMENTS

| DE | 44 27 423 A1 | 2/1996 |
| DE | 20 2005 002 351 U1 | 4/2005 |
| JP | 2004-326997 | 11/2004 |
| JP | 2005-085412 | 3/2005 |
| PL | 381805 | 9/2008 |
| WO | WO 02/054155 A1 | 7/2002 |
| WO | WO 2004/084470 | 9/2004 |

OTHER PUBLICATIONS

International Search Report dated Mar. 6, 2013 issued in corresponding International patent application No. PCT/PL2012/000066.
Written Opinion dated Mar. 6, 2013 issued in corresponding International patent application No. PCT/PL2012/000066.

* cited by examiner

*Primary Examiner* — David Karst
(74) *Attorney, Agent, or Firm* — Ostrolenk Faber LLP

(57) ABSTRACT

A method for chemically destroying magnetic data carriers. Recorded data are irretrievably eliminated and cannot be re-read. The carriers include aluminium or its alloys and ferromagnetic materials. They undergo a digestion reaction with an aqueous solution of a digesting mixture including: a) hydrochloric acid and (V)nitrate of one or more alkali metals, alkaline earth metals, rare earth metals and ammonium; or b) nitric(V) acid and chloride of one or more alkali metals, alkaline earth metals, rare earth metals and ammonium. The product of the reaction is an aqueous solution having aluminium hydroxide and chlorides and (V)nitrates of metals contained in the ferromagnetic metals and gaseous products of the reaction. Acidic salt solutions are utilized in a sewage treatment plant. Gaseous products including hydrogen and nitrogen oxides, after diluting with nitrogen, are directed to the atmosphere through an absorption system.

7 Claims, No Drawings

METHOD FOR CHEMICAL DESTROYING OF MAGNETIC DATA CARRIERS

CROSS-REFERENCE TO RELATED APPLICATIONS

The present application is a 35 U.S.C. §§371 National Phase conversion of PCT/PL2012/000066, filed Aug. 9, 2012, which claims priority of Polish Patent Application No. P.399758, filed Jul. 2, 2012, and European Patent Application No. 12005063.8, filed Jul. 9, 2012 the contents of each of which are incorporated by reference herein. The PCT International Application was published in the English language.

TECHNICAL FIELD OF THE INVENTION

The subject of the invention is a method for chemical destroying of magnetic data carriers, in particular hard disk platters.

BACKGROUND OF THE INVENTION

Magnetic data carriers make use of the ferromagnetism phenomenon for storing data. Recording and reading of data take place with the use of disk read-and-write heads. The examples of magnetic data carriers are a hard disk platter or a drum memory.

The method according to the invention can be very well applied for destroying of hard disk platters (computer magnetic disks), as it eliminates completely and irretrievably magnetic data carriers together with the data recorded thereon, and thus disables re-reading the data at a later time.

A computer hard disk comprises a hard structure (a hard disk casing) containing a drive unit, read and write circuits, controlling systems and from one to a few platters.

Hard disk platters, on which data is recorded, are usually made of aluminum or its alloys with magnesium and both their sides are covered with a very thin, polished layer with ferromagnetic properties. The alloys used in the production of ferromagnetic layers are alloys of elements such as Fe, Ni, Cr, Co, and optionally Nb, B, Si, Ta and others. Ferromagnetic layers are usually coated with a protecting layer, typically a protective layer of varnish.

In the state of the art, there are known and applied software data erasing methods involving multiple overwriting of sectors that include information with random number sequences. The software data erasing method includes the use of specially designed application for data erasing and the data carrier being in working order is a condition for the effectiveness of this method. Operation of data erasing software involves overwriting of data that is to be erased. As a result of the information overwriting, the data is permanently erased from the data carrier. The re-reading thereof is impossible even in specialist data retrieval laboratories. Each disk undergoes data erasing in a few cycles, techniques applying even up to 35 cycles of overwriting are employed.

There are also known and applied methods for physical destroying of data recorded on computer data carriers; they include scraping off the active layer, i.e. the layer responsible for data storing, from the data carrier surface. This method is employed in a device known from the Japanese patent application No. JP 2004-326997, in which a knife blade is directed onto the surface of the disk and after the pressure is activated, the blade cuts the overlay together with the protective and reflexive layer.

There are also known methods for thermal destroying of data carriers, e.g. methods using electromagnetic waves, such as microwaves. The U.S. patent application No. US 2004/0126450 describes the use of electromagnetic radiation in destroying data recorded on a device, which contains a data storage region and a transmitting region. The method described in this document involves destroying that applies electromagnetic radiation, such as microwave radiation, that induces the electric current flow in the transmitting layer of the disk in the storage data device. The produced heat causes a change in the physical properties of parts of the data storage region of the disk.

The U.S. patent application No. US 2001/0002297 describes a method for destroying of data carrier, e.g. a memory disk equipped with a pyrotechnical layer, wherein the pyrotechnical layer is detonated in order to destroy the data recorded on the data carrier. According to this method, the detonation is initiated with an electric igniter.

Other known methods involve crushing of a disk memory unit with a built-in data carrier in the form of a hard disk, as it was described in the Japanese patent application No. JP 2005-085412, wherein the device with the hard disk is crushed with its base by a pressure unit and the magnetic disk in the device being destroyed is deformed in such a way that the data recorded is impossible to be read.

Another known method for destroying data on hard disks is a chemical method. This method is employed in a system described in the international publication of patent application WO 2004/084470, the system is used to disable reading of the data stored on the data carriers and it involves the use of containers with reactant chemicals or an aerosol container. The U.S. patent application No. US 2005/0257049 describes a chemical substance used for disabling reading of data from a magnetic data carrier that has the following composition: cerium ammonium nitrate in the quantity of 2 to 20% by weight, hydrochloric acid in the quantity of 1.8 to 10% by weight, and water. German utility model application No. DE 20 2005 002 351 U1 describes a device used for erasing information, in which the data carrier is subjected to mechanical means and an acid or an alkaline solution that irretrievably chemically etches the surface of the data carrier.

Polish patent application No. P.381805 [PL381805] describes a two stage method for complete chemical destroying of data carriers. In the first stage, the aluminum layer of the hard disk platters is dissolved with the use of sodium hydroxide aqueous solution with concentration of 20 to 50% by weight, or hydrochloric acid aqueous solution with concentration of 10 to 36% by weight, or sulphuric(VI) acid aqueous solution with concentration of 10 to 60% by weight. In the second stage, the ferromagnetic layer, remaining after the first stage, is dissolved with the use of aqua regia. The disadvantage of this method consists in that it is conducted in two separate reactors, and two different aqueous solutions are obtained as final products thereof, and thus they have to be separately channeled to a sewage treatment plant in order to utilize them.

SUMMARY OF THE INVENTION

The method for chemical destroying of magnetic data carriers, according to the invention, is characterized in that the magnetic data carriers comprising aluminum or its alloys and ferromagnetic materials are subjected to a digestion reaction in a reactor with an aqueous solution of a digesting mixture that comprises: a) hydrochloric acid and (V)nitrate of one or more alkali metals, alkaline earth metals, rare earth metals and ammonium; or b) nitric(V) acid and chloride of one or more alkali metals, alkaline earth metals, rare earth metals and ammonium; the product of the digestion reaction is an aqueous solution comprising aluminum hydroxide and chlorides and (V)nitrates of metals contained in the ferromagnetic metals as well as gaseous products of the reaction. Aluminum hydroxide is the final product of the hydrolysis of aluminum salt.

DESCRIPTION OF PREFERRED EMBODIMENTS

In the preferred embodiment the reaction of complete digestion of magnetic data carriers is performed with the use of an aqueous solution of hydrochloric acid with concentration of 1 to 20% by weight, in a mixture with an aqueous solution of (V)nitrate of one or more alkali metals, alkaline earth metals, rare earth metals and ammonium with concentration of 1 to 30% by weight, at temperature of 20 to 90° C.

Preferably the reaction is performed with the use of an aqueous solution of hydrochloric acid with concentration of 10 to 20%, more preferably 15 to 20% by weight, in a mixture with an aqueous solution of (V)nitrate of one or more alkali metals, alkaline earth metals, rare earth metals and ammonium with concentration of 5 to 30%, more preferably 10 to 30%, and still more preferably 20 to 30% by weight.

Preferably (V)nitrate of one or two alkali metals, alkaline earth metals, rare earth metals and ammonium is used.

Preferably an aqueous solution of hydrochloric acid with concentration of 10 to 20% by weight and therein dissolved ammonium (V)nitrate with concentration of 1 to 10% by weight is used.

Alternatively, the digestion reaction is performed with the use of an aqueous solution of nitric(V) acid with concentration of 1 to 30% by weight, in a mixture with an aqueous solution of chloride of one or more alkali metals, alkaline earth metals, rare earth metals and ammonium with concentration of 1 to 20% by weight, at temperature of 20 to 90° C.

Preferably the reaction is performed with the use of an aqueous solution of nitric acid with concentration of 10 to 30%, more preferably 20 to 30% by weight, in a mixture with an aqueous solution of chloride of one or more alkali metals, alkaline earth metals, rare earth metals and ammonium with concentration of 10 to 20%, more preferably 15 to 20% by weight.

Preferably chloride of one or two alkali metals, alkaline earth metals, rare earth metals and ammonium is used.

Preferably an aqueous solution of nitric(V) acid with concentration of 15 to 25% by weight and therein dissolved sodium chloride with concentration of 5 to 15% by weight is used.

According to the invention, the aqueous solution comprising acidic salt solutions as obtained in the digestion reaction is utilized in a sewage treatment plant. Gaseous products of the reaction comprising hydrogen and small amounts of nitrogen oxides, after diluting with nitrogen, are directed to the atmosphere through an absorption system, in which the nitrogen oxides are efficiently absorbed.

The magnetic data carriers, before being subjected to the digestion reaction, are fragmented into stripes with the width of 0.1 to 5 mm.

However, in more preferred embodiments the magnetic data carriers are fragmented into stripes with the width of 0.1 to 3 mm, and still more preferably of 0.5 to 1 mm.

Preferably in the method of the present invention hard disk platters are subjected to the digestion reaction.

The hard disk platters, before being subjected to the digestion reaction, are taken out from a hard disks casing after disassembling thereof by unscrewing or drilling or knocking out of screws with a screwdriver or an electric screw gun.

The main advantage of the method of the present invention consists in complete and irretrievable destroying of the data carrier together with the data as recorded thereon and thus eliminating any possibility of re-reading the data in a later time.

Other advantages resulting from the method of the present invention are: conducting of the entire chemical process in one reactor and in one solution, safety of performing the chemical process thanks to employing diluted acid solutions, environmental safety of the process for data carrier destroying as resulting from employing of the nitrogen oxide absorption and utilization of liquid final products of the reaction in a sewage treatment plant.

The method for destroying data recorded on computer hard disks and other magnetic data carriers according to the present invention is particularly useful during erasing data in the following situations: handing the computer over to another user, sale of a computer used by a company, replacement of a faulty hard disk or a computer failure.

The method according to the invention is particularly suitable for the computer users whose information, such as personal data of employees, payrolls, correspondence, payment cards numbers and bank account numbers, invoices, customers and clients lists, internal reports, statements, projects, and signature specimens, absolutely has to be permanently erased from any data carriers.

The subject of the invention has been explained in more detail in the working examples.

Example 1

20 kg of aqueous solution of hydrochloric acid with concentration of 15% by weight and 1000 g of ammonium (V)nitrate were introduced into a glass reactor provided with a stirrer, an exhaust system, a nitrogen dispensing system and a cooling system. After dissolving of the salt in the solution of the acid, 25 hard disk platters fragmented into thin stripes with the width of 0.5 to 1 mm were introduced into the reactor. The stirrer, the nitrogen injection and the exhaust system were turned on. The digestion reaction of the magnetic data carriers was conducted in the temperature of about 90° C., until the complete digestion of the hard disk platters. The gases that had been liberated during the reaction were directed to the exhaust system through the absorption system. The solution obtained after the reaction was directed to a sewage treatment plant.

Example 2

21 kg of aqueous solution of nitric(V) acid with concentration of 20% by weight and 2100 g of sodium chloride were introduced into a reactor made of acid resistant steel provided with a stirrer, an exhaust system, a nitrogen dispensing system and a cooling/heating system. After dissolving of the salt in the solution of the acid, 20 hard disk platters fragmented into thin stripes with the width of 0.5 to 1 mm were introduced into the reactor. The stirrer, the nitrogen injection and the exhaust system were turned on. The digestion reaction of the magnetic data carriers was conducted in the temperature of about 90° C., until the complete digestion of the hard disk platters.

The gases that had been liberated during the reaction were directed to the exhaust system through the absorption system. The solution obtained after the reaction was directed to a sewage treatment plant.

What is claimed is:

1. A method for chemical destroying of magnetic data carriers, wherein the magnetic data carriers comprising aluminium or its alloys and ferromagnetic materials are subjected to a digestion reaction in a reactor with an aqueous solution of a digesting mixture that comprises:
   a) hydrochloric acid and (V)nitrate of one or more alkali metals, alkaline earth metals, rare earth metals and/or ammonium; or
   b) nitric(V) acid and chloride of one or more alkali metals, alkaline earth metals, rare earth metals and/or ammonium;
   the product of the digestion reaction is an aqueous solution comprising aluminium hydroxide and chlorides and (V)nitrates of metals contained in the ferromagnetic materials as well as gaseous products of the reaction, whereas
   the magnetic data carriers, before being subjected to the digestion reaction, are fragmented into stripes with a width of 0.1 to 5 mm.

2. The method according to claim 1 wherein the aqueous solution of digesting mixture comprises the hydrochloric acid at a concentration of 1 to 20% by weight and the (V)nitrate of one or more alkali metals, alkaline earth metals, rare earth metals and/or ammonium at a concentration of 1 to 30% by weight, and a temperature of the aqueous solution of the digesting mixture is 20 to 90° C.

3. The method according to claim 1 wherein the aqueous solution of the digesting mixture comprises the nitric(V) acid at a concentration of 1 to 30% by weight and the chloride of one or more alkali metals, alkaline earth metals, rare earth metals and/or ammonium at a concentration of 1 to 20% by weight, and a temperature of the aqueous solution of the digesting mixture is 20 to 90° C.

4. The method according to claim 1, further comprising directing the aqueous solution comprising aluminum hydroxide and chlorides and (V)nitrates of metals contained in the ferromagnetic materials to a sewage treatment plant.

5. The method according to claim 1, wherein the gaseous products of the reaction comprise hydrogen and nitrogen oxides the gaseous products are diluted with nitrogen and are directed to the atmosphere through an absorption system.

6. The method according to claim 1, wherein the magnetic data carriers are hard disk platters.

7. The method according to claim 6 wherein the hard disk platters, before being subjected to the digestion reaction, are taken out from a hard disks casing after disassembling thereof by unscrewing or drilling or knocking out of screws with a screwdriver or an electric screw gun.

* * * * *